US009950288B2

(12) United States Patent
Holzmann et al.

(10) Patent No.: US 9,950,288 B2
(45) Date of Patent: Apr. 24, 2018

(54) DRIPLESS FILTER ASSEMBLY AND METHOD FOR SERVICING A FILTRATION APPARATUS WITH THE SAME

(75) Inventors: Mark V. Holzmann, Stoughton, WI (US); Christopher E. Holm, Madison, WI (US); Brian W. Schwandt, Fort Atkinson, WI (US); Mike J. Connor, Stoughton, WI (US); Clint T. Deweese, Cookeville, TN (US); Roger Zoch, McFarland, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 1927 days.

(21) Appl. No.: 11/869,229

(22) Filed: Oct. 9, 2007

(65) Prior Publication Data
US 2009/0090669 A1  Apr. 9, 2009

(51) Int. Cl.
| | | |
|---|---|---|
| *B01D 35/30* | (2006.01) | |
| *B01D 29/13* | (2006.01) | |
| *B01D 27/08* | (2006.01) | |
| *B01D 46/00* | (2006.01) | |

(52) U.S. Cl.
CPC ..... *B01D 46/0002* (2013.01); *B01D 46/0091* (2013.01); *B01D 2271/02* (2013.01); *Y10T 29/49815* (2015.01)

(58) Field of Classification Search
CPC ............ B01D 2271/02; B01D 46/0002; B01D 46/0091; B01D 2201/0438; B01D 2201/302; B01D 27/08; B01D 2201/34; Y10T 29/49815
USPC ........................................ 210/450, 455, 459
See application file for complete search history.

(56) References Cited

U.S. PATENT DOCUMENTS

| | | | | | |
|---|---|---|---|---|---|
| 4,113,627 | A | * | 9/1978 | Leason | 210/446 |
| 4,119,540 | A | * | 10/1978 | Muller | 210/142 |
| 4,319,997 | A | * | 3/1982 | Pett | 210/85 |
| 4,451,371 | A | * | 5/1984 | Peck | 210/325 |

(Continued)

FOREIGN PATENT DOCUMENTS

| | | |
|---|---|---|
| DE | 11 2007 000 896 | 3/2009 |
| KR | 10-2006-0084001 A | 7/2006 |

OTHER PUBLICATIONS

International Search Report of PCT/US2008/070737, dated Feb. 18, 2009.

(Continued)

*Primary Examiner* — Bobby Ramdhanie
*Assistant Examiner* — Denise R Anderson
(74) *Attorney, Agent, or Firm* — Foley & Lardner LLP

(57) ABSTRACT

A fluid filter assembly of a filtration system is described. The filter assembly described includes a cover member and a filter cartridge having at least one filter element and a plate member. The plate member includes a seal surface on one side facing the cover member, and a seal surface on another side facing away from the cover member. The seal surface facing the cover member is configured to seal with the cover member, and the seal surface facing away from the cover member configured to seal with another component of the filtration system. The assembly provides a structure that can retain a seal between sealing surfaces of the cover and the filter cartridge, at least while the fluid filter assembly is being serviced, so as to at least minimize fluid dripping and leakage.

15 Claims, 11 Drawing Sheets

(56) References Cited

U.S. PATENT DOCUMENTS

| | | | |
|---|---|---|---|
| 4,969,994 A | 11/1990 | Misgen et al. | |
| 5,298,044 A * | 3/1994 | Sutton et al. | 55/378 |
| 5,695,636 A | 12/1997 | Gullett | |
| 6,024,229 A | 2/2000 | Ayers | |
| 6,235,073 B1 * | 5/2001 | Bannister et al. | 55/385.3 |
| 6,478,019 B2 * | 11/2002 | Fedorowicz et al. | 123/572 |
| 6,715,459 B2 * | 4/2004 | Rosendahl et al. | 123/195 C |
| 7,582,130 B2 | 9/2009 | Ng et al. | |
| 2001/0040120 A1 | 11/2001 | Jousset et al. | |
| 2004/0023090 A1 * | 2/2004 | Pearson et al. | 429/30 |
| 2005/0023210 A1 * | 2/2005 | Connor et al. | 210/450 |
| 2007/0240392 A1 | 10/2007 | Ng et al. | |

OTHER PUBLICATIONS

Written Opinion of the International Searching Authority of PCT/US2008/070737, dated Feb. 18, 2009.

Office Action issued for German Patent Application No. 112008002709.9, dated Mar. 7, 2016, 10 pages.

\* cited by examiner

DRIPLESS FILTER ASSEMBLY AND METHOD FOR SERVICING A FILTRATION APPARATUS WITH THE SAME

FIELD

A fluid filter assembly is disclosed, which can facilitate filtration system servicing. A filter assembly is disclosed with a seal and retention configuration that may at least minimize dripping and leakage, while the filter assembly is being serviced.

BACKGROUND

Fluid filters are widely known and used. After a period of time and usage, many fluid filters undergo wear, and eventually must have their filter element(s) serviced and/or replaced. Many fluid filters also have multiple parts that must be removed in order to access the filter element(s).

However, many fluid filters are structured to be relatively disposed in low tolerance areas having rather tight fits, so that such fluid filters occupy a minimal amount of space. As a result, servicing such fluid filters and replacing their filter element(s) can be difficult. For example, servicing the fluid filter has involved moving or removing surrounding components of an engine and other parts of the fluid filter to gain access to the filter element(s). Furthermore, servicing has been known to be messy due to such spatial constraints and dripping has been known to occur when removing the fluid filter to replace the filter element(s). Thus, improvements can still be made to existing fluid filters and to existing fluid filter servicing processes.

SUMMARY

The following technical disclosure describes an improved fluid filter assembly for a filtration system and that can improve a method for servicing a fluid filter. The filter assembly described herein includes sealing and retention features, which are configured to retain a cover and filter cartridge together at least during removal of the filter assembly for servicing of a filter element of the cartridge, and which are configured to maintain a seal between sealing surfaces thereof, such that fluid dripping and leakage may be minimized.

Some benefits of a fluid filter assembly as described herein can include providing a cleaner and more efficient method of servicing, where dripping and/or leakage can be prevented or at least minimized, and where easier access can be obtained.

In one embodiment, a filter assembly of a filtration system includes a cover member and a filter cartridge. The filter cartridge includes at least one filter element, where the filter element is configured to be disposed on a plate member. The cover member is configured to cover the filter cartridge. The filter element is disposed between the plate member and the cover member. The plate member includes a seal surface disposed on one side facing the cover member, and a seal surface disposed on another side facing away from the cover member. The seal surface facing the cover member is configured to seal with a seal surface of the cover member, and the seal surface facing away from the cover member is configured to seal with another component of a filtration system.

In one embodiment, a filter assembly includes at least one retention member disposed on the seal plate. The retention member is configured to connect and disconnect the filter cartridge to and from the cover member. The retention member is configured to retain the filter cartridge to the cover member and to retain a seal between the seal surfaces of the plate member and the cover member.

In another embodiment, connecting members are disposed on the cover member. The connecting members are configured to connect or disconnect the filter assembly to a component of a filtration system. The retention member is further configured to retain the filter cartridge to the cover member and to retain the seal between the seal surfaces of the plate member and the cover member, independent any connecting or disconnecting operation of the connecting members.

In one embodiment, the seal surfaces are respectively disposed on the plate member and proximate an outer perimeter of the seal plate. In yet another embodiment, the seal surfaces are respectively disposed on opposite major surfaces of the plate member.

In another embodiment, a method of servicing a fluid filter of a filtration system includes removing a filter assembly having a cover and a filter cartridge from a filtration system, the filter cartridge including a used filter element. The cover is disconnected from the filter cartridge. The filter cartridge and used filter element is replaced with a new filter cartridge and new filter element. The cover is connected to the new filter cartridge having the new filter element, and the filter assembly having the new filter element is connected to the filtration system. The step of removing the filter assembly further includes retaining a seal between a sealing surface of the cover and a sealing surface of the filter cartridge, at least while the filter assembly is being removed, so as to at least minimize fluid leakage and dripping through the sealing surfaces.

In one embodiment, retaining the seal between the sealing surfaces of the cover and filter cartridge includes sealing a plate member of the filter cartridge to the cover using a seal member disposed on the plate member, while removing the filter assembly.

In another embodiment, connecting the cover to the new filter cartridge having the new filter element includes resealing the sealing surfaces of the filter cartridge and the cover, and where replacing the filter assembly includes sealing the filter cartridge with the filtration system.

DETAILED DESCRIPTION

Figure 1:
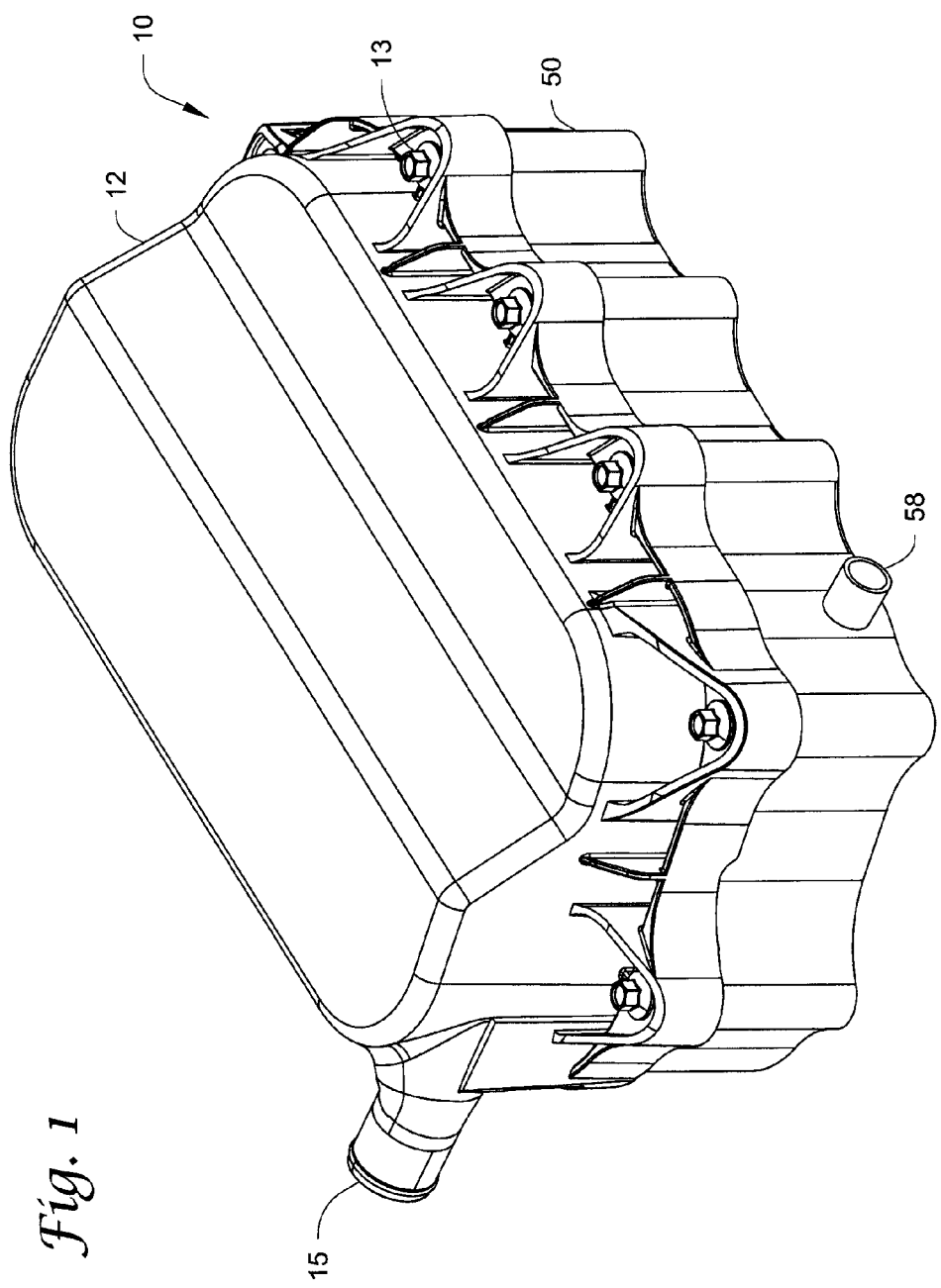
FIG. 1 is a perspective view of one embodiment of a fluid filter assembly connected to an example of a volume containing equipment of a filtration system.
Figure 2:
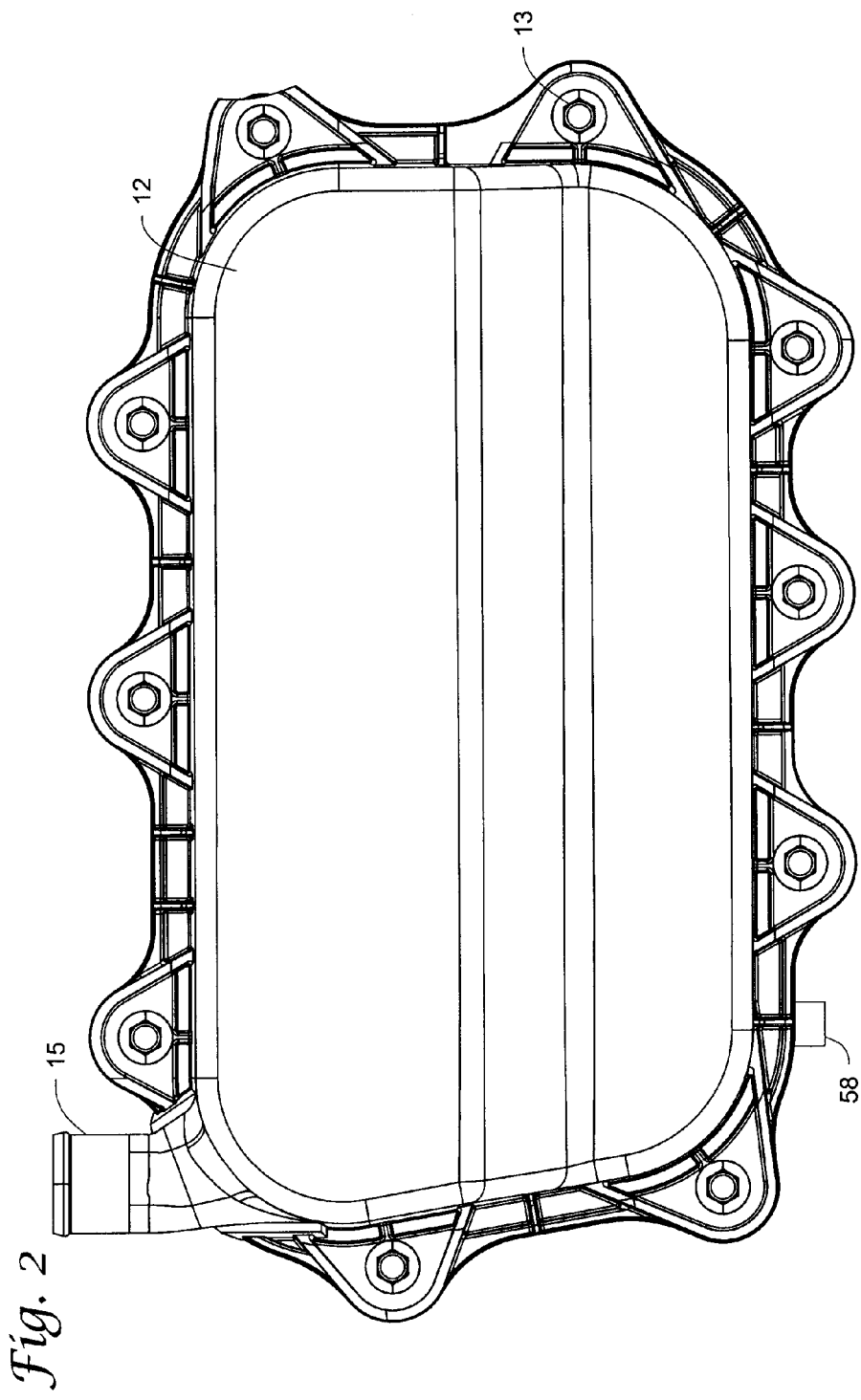
FIG. 2 is a top view of the fluid filter assembly of FIG. 1.
Figure 3:
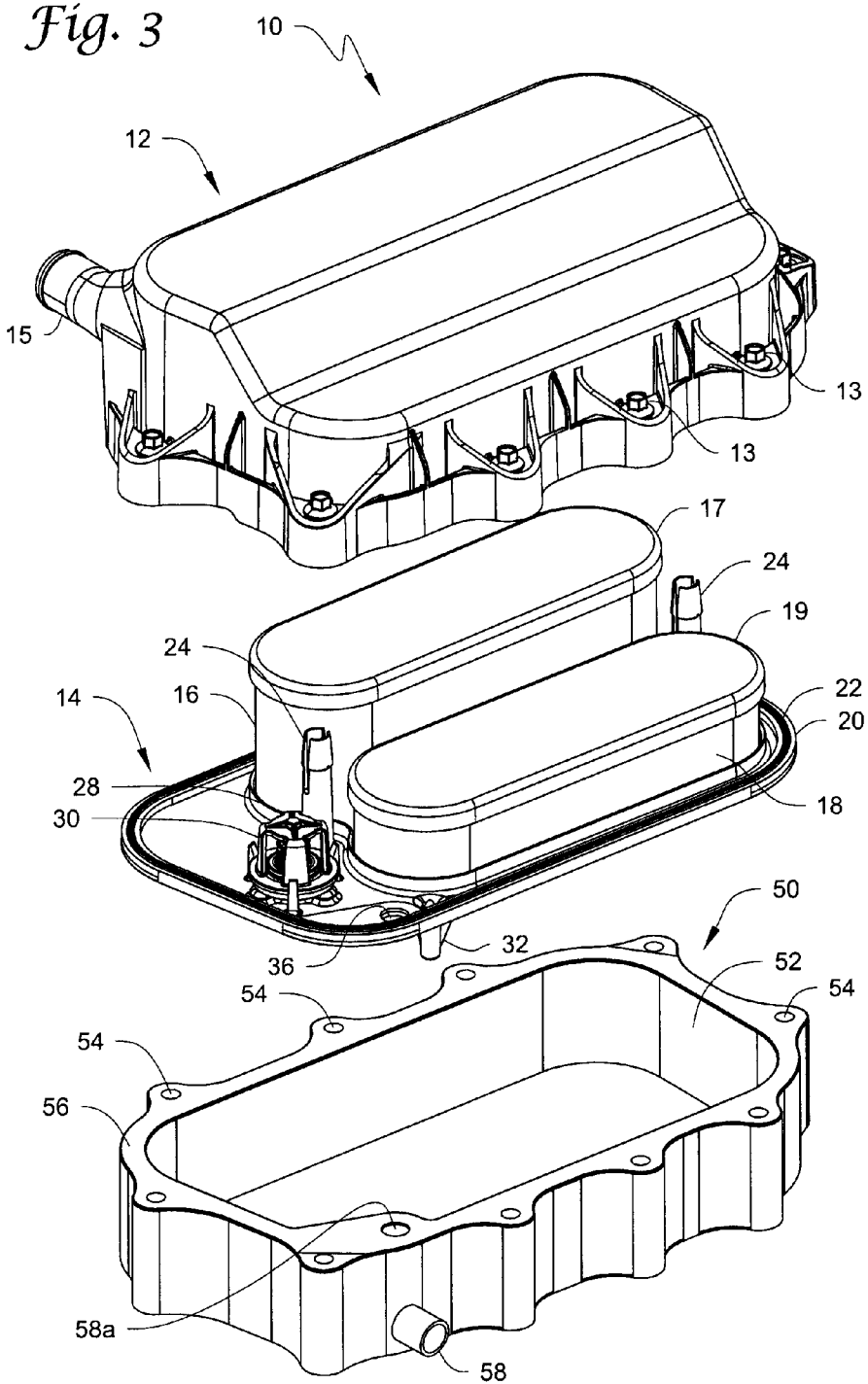
FIG. 3 is an exploded view of the fluid filter assembly of FIG. 1.

The fluid filters described herein can generally provide an improved structure for servicing a filter element of the fluid filter that can maintain a seal during removal thereof, such that fluid dripping and leakage may be minimized. For example, a fluid filter assembly is described that includes a cover and a filter cartridge with sealing and retention features. The sealing and retention features are configured to retain the cover and filter cartridge together at least during removal of the filter assembly for replacement of a filter element of the cartridge. The fluid filter assembly may be useful, for example, in a variety of filtration systems for engines, such as but not limited to oil filtration. In some cases, the fluid filter assembly 10 described herein may be employed in such known combustion engines having turbo capability, and the assembly 10 may be used to separate air from oil, aerosol, and mass particulate, so that clean air may be delivered or "breath" back to an air inlet duct port, such as a turbo inlet duct.

FIGS. 1-8 illustrate one embodiment of a fluid filter assembly 10. As shown, the fluid filter assembly 10 is connected with a generic component 50 of a filtration system. As some examples only, the component 50 may be a reservoir or container that allows fluid flowing through a filtration system, such as in a combustion engine, to enter and collect in the reservoir 50 through an inlet 60 and travel to the fluid filter assembly 10. After filtration through the fluid filter assembly 10, the filtered fluid may exit the fluid filter assembly and travel back to its respective system for use through outlet 58. In another example, the component 50 may be any valve cover that may be employed in combustion engines, so as to allow engine lubrication oil to be filtered and flow back into the system through the outlet 58. It will be appreciated that the component 50 is shown for purposes of illustrating an environment in which the fluid filter assembly 10 may be connected to a filtration system. Any additional description of the component 50 is for convenience and is not to be construed as a limiting component of the fluid filter assembly 10.

Figure 4A:
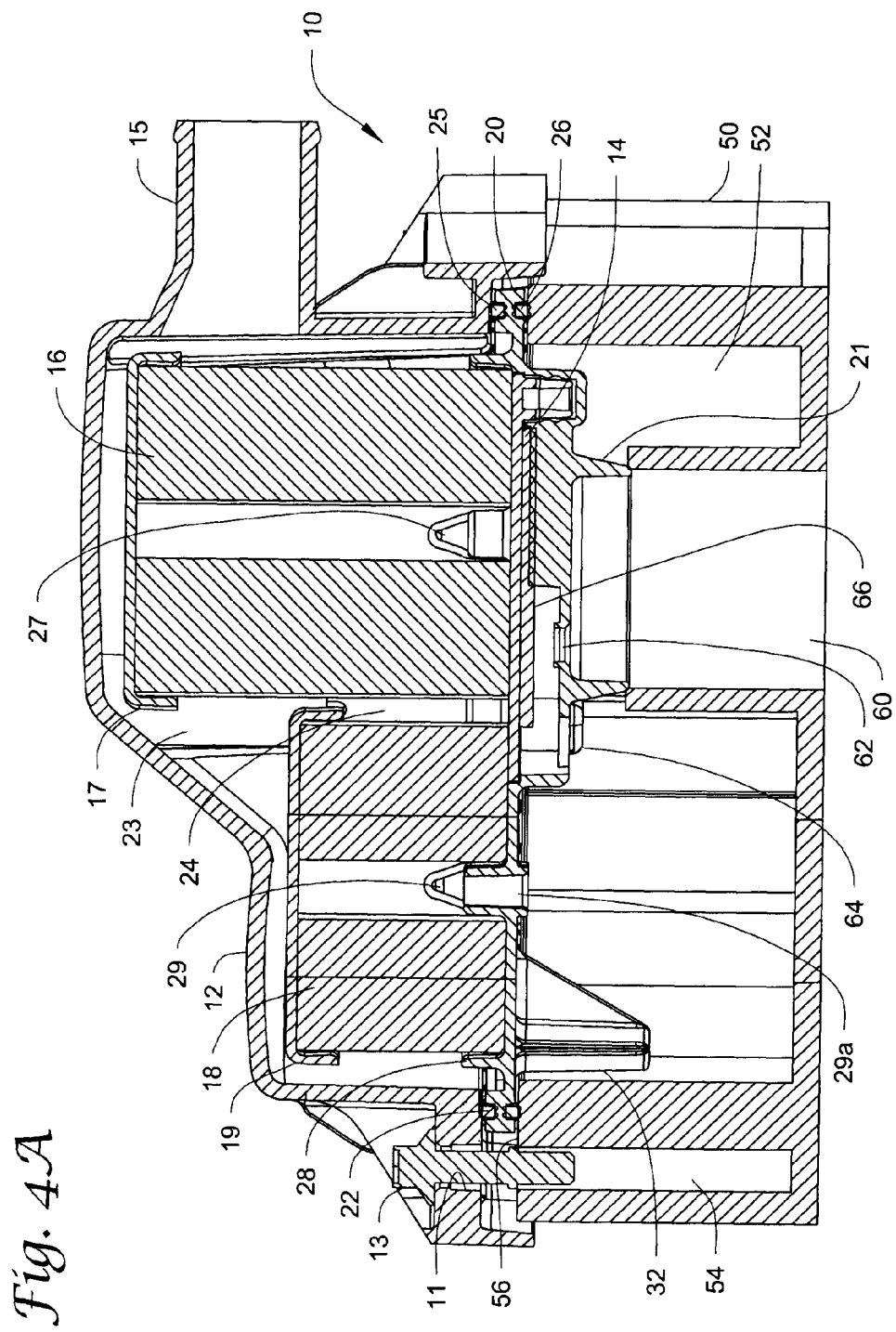
FIG. 4A is a side partial sectional view of the fluid filter assembly of FIG. 1 and taken proximate the left end of the fluid filter assembly as shown in FIG. 2.
Figure 4B:
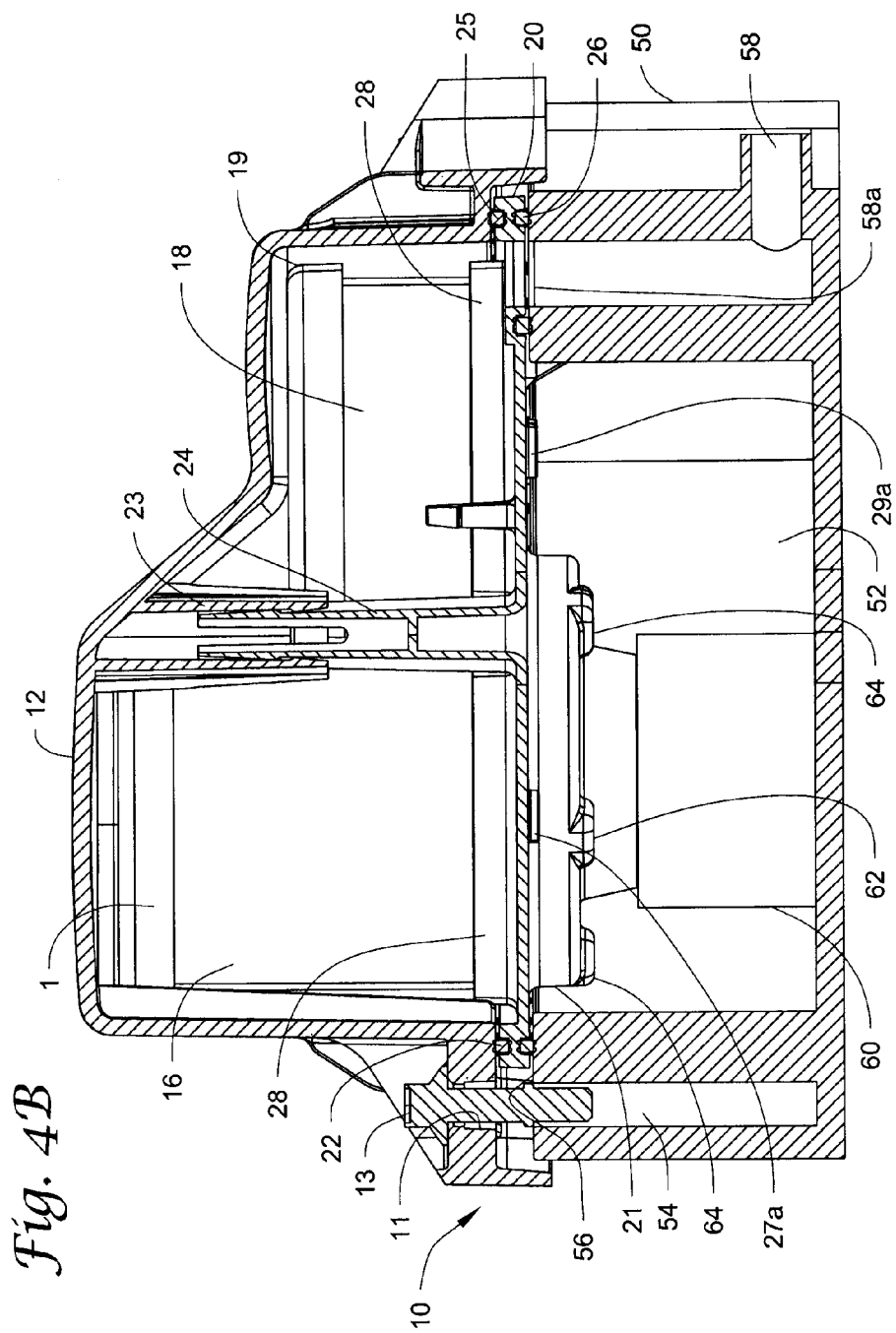
FIG. 4B is a side partial section view of the fluid filter assembly of FIG. 1 and taken proximate the right end of the fluid filter assembly as shown in FIG. 2.
Figure 4C:
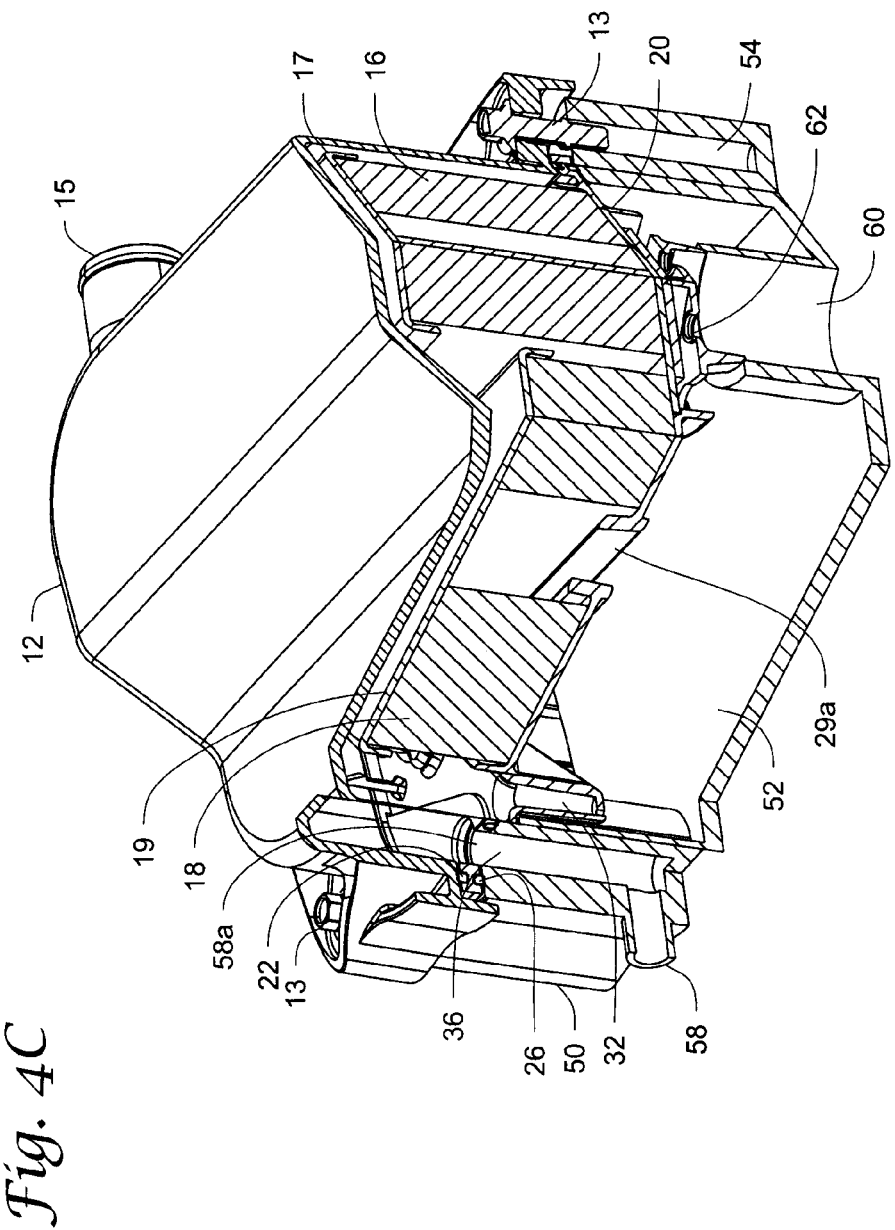
FIG. 4C is a perspective partial sectional view of the fluid filter assembly of FIG. 1.
Figure 5:
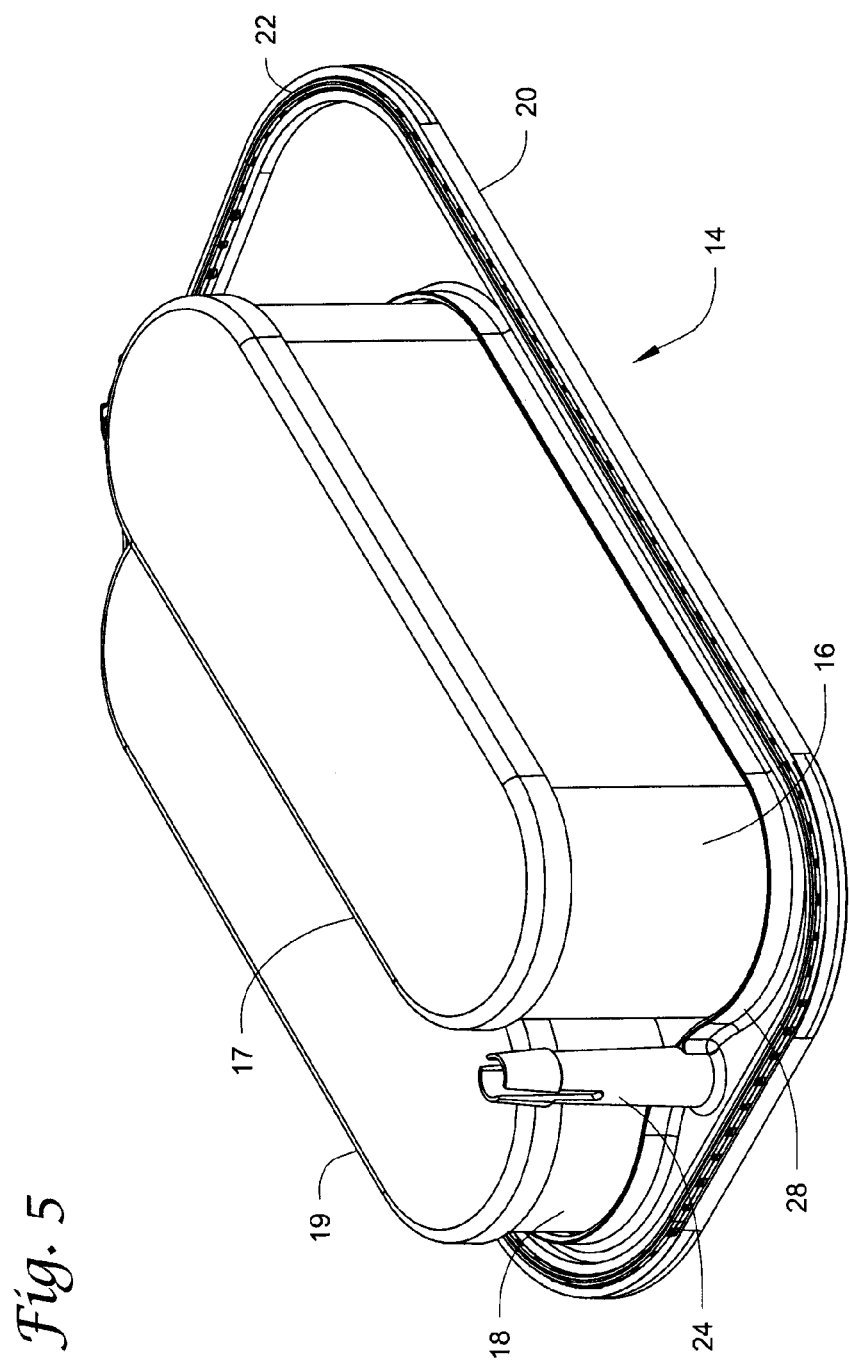
FIG. 5 is a perspective view of one embodiment of a fluid filter cartridge of the fluid filter assembly shown in FIG. 1.
Figure 6:
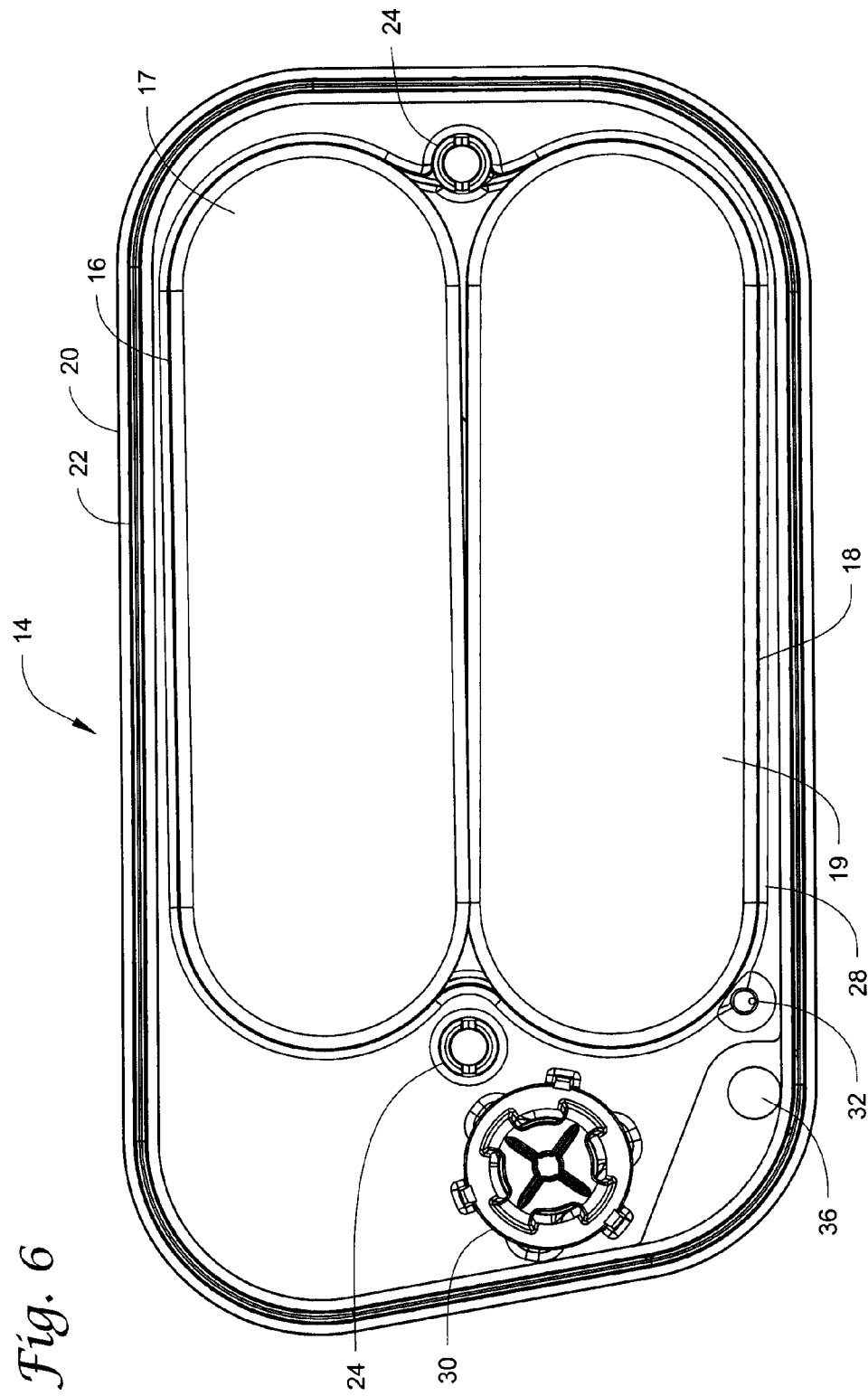
FIG. 6 is a top view of the fluid filter cartridge shown in FIG. 5 of the fluid filter assembly shown in FIG. 1.

The fluid filter assembly 10 includes a cover member 12 and a filter cartridge 14. The cover member 12 includes an inner housing volume so as to substantially enclose the filter cartridge 14. The cover member 12 includes connecting members 13. The connecting members 13 are disposed about a perimeter of the cover member 12. In one example, the connecting members may be a number of nut and bolt structures. The connecting members 13 are configured to connect the fluid filter assembly 10 to a component of a filtration system, such as component 50, and through holes 11 of the cover member 12. (FIGS. 4A-C.)

It will be appreciated that the cover member 12 is not limited to the specific structure shown, and may be constructed of any number of shapes and sizes so as to accommodate the particular application of the fluid filter assembly 10. As one example, the cover member 12 may resemble and function as a breather cover, when the fluid filter assembly 10 is to be employed in a typical crankcase breather ventilation filter system. Accordingly, the cover member 12 may take on various geometric configurations not limited to that shown in the Figures, as outlet 15 may have various angles for allowing exit of flow gases, which will be further described herein.

The filter cartridge 14 includes at least one filter element 16, 18 and a plate member 20. As shown, there are two filter elements 16, 18 disposed on one side of the plate member 20. It will be appreciated that the filter assembly 10 is not limited to two filter elements, and more or less filter elements may be used as desired and/or necessary. It further will be appreciated that the filter elements are not limited to the specific size and shape shown, as any number of shapes and sizes may be employed as suitable and/or necessary for the particular application of the fluid filter assembly 10. For example, various heights of the filter elements may be used and may be based on the need for 1) a taller element to a) provide further vertical drain height for oil, b) reduce pressure drop and c) extend service intervals or the need for 2) clearances within the engine compartment which the fluid filter assembly is used 10. For example, an air box in some known combustion engines usually is in the way of the top side of the cover member 12 and thus there may be a need for one filter element to be shorter in height down than the other (i.e. filter element 16 is taller than filter element 18). It further will be appreciated that clearance issues may arise with other engine components, and that the filter element and cover configuration may be modified as needed to address such issues, for example with battery trays, brackets to alternators, the engine itself, etc.

In one embodiment, the filter elements 16, 18 are disposed on the side of the plate member 20 that faces toward the inner volume of the cover member 12. As shown, when the plate member 20 is connected to the cover member 12, the filter elements 16, 18 are disposed between the plate member 20 and the cover member 12.

In one embodiment, the filter elements 16, 18 are configured with suitable filter media to allow fluid to be filtered through inner sides of the filter elements 16, 18 and into an outer area thereof. The filter elements 16, 18 both include an end plate 17, 19 that seals its respective filter element 16, 18, so as to direct flow through the sides. The filter media may be any material suitable to separate a desired fluid from a fluid flow entering the fluid filter assembly. As one example in combustion engines, the filter media may be constructed so as to be suitable for separating fluid such as flow gases from oil and aerosol during oil filtration, and where the filtered oil exits the fluid filter assembly 10 for continued use in the engine and the flow gases exit as air such as to a turbo inlet duct.

In one embodiment, the plate member 20 includes two opposite major surfaces or sides. As described, the filter elements 16, 18 are disposed on one side or major surface of the plate member 20. The plate member 20 includes a locating structure 28 disposed on the same side as where the filter elements 16,18 are to be disposed. The locating structure is configured to surround a perimeter of the filter elements 16, 18, and is configured to allow the filter elements 16, 18 to be properly positioned and retained on the plate member 20. In one embodiment, the filer elements 16, 18 are secured and sealed to the plate member 20, such as by an adhesive, thermal plastic bonding, or other mechanical structure as known to one of skill in the art. In such a configuration, the entire filter cartridge including the filter elements 16, 18 and plate member 20 may be replaced.

As an alternative, it will be appreciated that the filter elements 16, 18 may be removable from the plate member 20. In this configuration, the filter elements 16, 18 would be disposable, while the plate member 20 may be reused. It further will be appreciated that the plate member 20 may also be disposable after one or more uses.

The plate member 20 may be molded plastic material that can be disposed after use, or in the event the filter elements are removable then plate member 20 may be reusable. It will be appreciated, however, that the material employed for constructing the plate member 20 is not limited to a molded plastic material as other materials may also be suitable. As some examples only, the plate member 20 may be constructed of a machined metal such as aluminum, or formed as a thermosetting plastic material.

At least one retention member 24 is disposed on one side of the plate member 20. The retention member 24 is configured to connect to and disconnect from the cover member 12. When connected to the cover member 12, the retention member 24 retains the filter cartridge in connection with the cover member and retains them in a sealing engagement, which will be further described herein. The retention member 24 is further configured to retain the seal between the cover member and the filter cartridge, independent any connecting or disconnecting operation of the connecting members 13, and such as when the filter assembly 10 is removed from a filtration system for servicing (i.e. component 50), and where the cover member 12 is to be disconnected using the connecting members 13.

As shown, two retention members 24 are shown on the plate member 20 on the side the filter elements 16, 18 are disposed. It will be appreciated that one retention member or more than two retention members may be employed as necessary and/or suitable, as long as the cover member 12 can be retained with the filter cartridge when they are to be connected.

Figure 8:
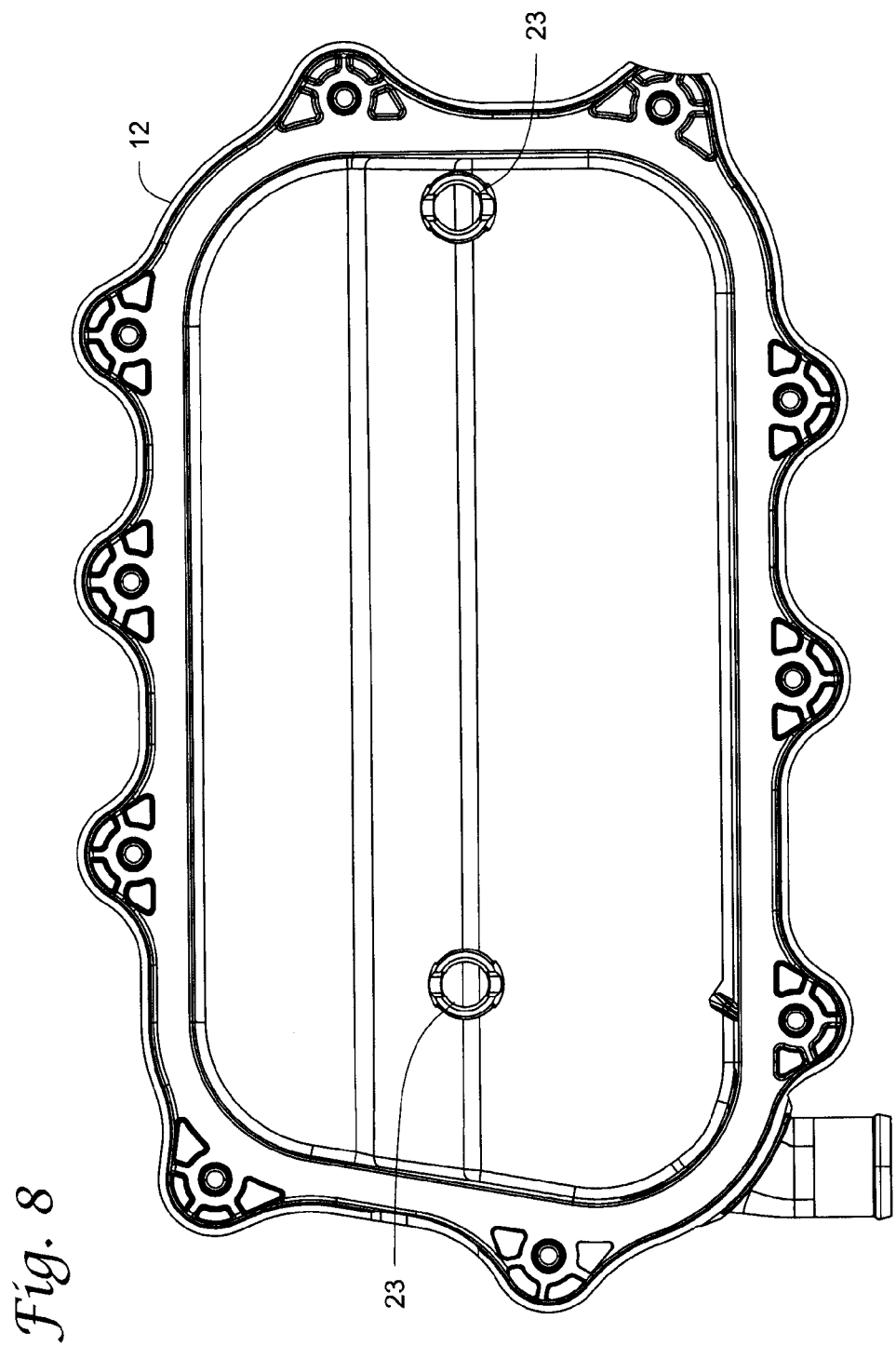
FIG. 8 is a bottom view of one embodiment of a cover of the fluid filter assembly.

As further shown, the retention members 24 are extended portions having a barbed end and a slot. The tapering configuration of the barbed ends allows the retention members 24 to be inserted into a corresponding connecting structure 23 on the cover member 12, while the shoulder can retain a connection with the corresponding connection structure 23 of the cover member 12. As shown in FIG. 8, the connecting structure 23 is disposed on the underside of the cover member 12 and is configured to receive and connect to the retention members 24. In one embodiment, such a configuration allows the retention members 24 to connect with the cover member 12 in a male/female engagement. The slots allow separate end portions of the barbed end to be moved toward each other, so that the shoulder engagement can be released from the cover member 12. In such as configuration, the retention members can be connected and disconnected to the cover member 12. It will be appreciated that the retention members 24 are not limited to the specific structure shown, and the concept of the retention members may be accomplished employing a variety of structures. Some examples include, but are not limited to, various snap fit retentions, bolts and screws, self-tapping screws, or other fastening means suitable in the art.

Further locating structures 27, 29 are disposed within a perimeter of locating structure 28. The locating structures 27, 29 are configured as protrusions extending from the side of the plate member 20 where the filter elements 16, 18 are disposed. The locating structures 27, 29 are insertable into an inner space of its respective filter element 16, 18, such that an inner wall of its filter element 16, 18 covers the locating structure 27, 29. The locating structures 27, 29 include openings so that filtered fluid can flow through one side of the plate member 20 to the other side. (See FIGS. 4 and 7.)

A seal surface 22, 26 is disposed on each of the major surfaces of the plate member 20. In one embodiment, the seal surfaces 22, 26 are disposed about the perimeter of the plate member 20 at their respective sides.

Seal surface 22 is disposed on the side where the filter elements 16, 18 are disposed. The seal surface 22 faces the cover member 12 when the plate member 20 is engaged with the cover member 12. The seal surface 22 is configured to form a fluid tight seal with a seal surface 25 of the cover member 12. The seal surface 22 is configured to maintain its seal with the seal surface 25 of the cover member 12 even when the filter assembly is disconnected from another component of a filtration system (e.g. component 50), and until the cover member 12 is to be disconnected from the filter cartridge 14 or plate member 20.

Seal surface 26 is disposed on an opposite side that the filter elements 16, 18 are disposed. The seal surface 26 faces away from the cover member 12, when the plate member 20 is engaged with the cover member 12. The seal surface 26 is configured to form a fluid tight seal with a seal surface of another component of a filtration system, such as a container or reservoir (e.g. component 50). In one example, seal surface 56 of component 50 can provide a suitable seal surface for the seal surface 26 of the plate member 20 to engage, and thus seal the filter assembly 10 to the component 50.

In one embodiment, the seal surfaces 22, 26 may be an overmold structure formed on the plate member 20. In yet another embodiment, the seal surfaces 22, 26 are integrally molded seals formed on the plate member 20. The seal surfaces 22, 26 may also be constructed as seal members disposed on the plate member, and may resemble rib-like structures or square-like gasket members. As shown for example in FIG. 4, the seal members are disposed in grooves of the plate member 20. The seal surfaces 22, 26 may be constructed of a compressible material that suitably engages respective sealing surfaces of the cover member 12 and component 50 in a fluid tight seal.

As some examples only, the material for the seal members may be an elastomeric material, such as formed from a thermosetting elastomer as liquid silicone rubber (LSR), a high consistency rubber (HCR), such as Vamac, Viton, HNBR, ECO, nitrile, or the like. Other examples for the seal member material may also include but are not limited to a thermoplastic elastomer, such as thermoplastic silicone vulcanite (TPSiV) or an ethylene rubber mixed in a polypropylene matrix, or the like. It will be appreciated that the material for the seal surfaces is not limited as long as a suitable material is employed to achieve the desired sealing function described.

With further reference to the component 50, the component 50 is shown as a container or reservoir that includes a volume capacity 52. Holes 54 are provided to allow for the filter assembly 10 to be connected to the component 50. As one example, the holes 54 allow for insertion of the connecting members 13, so as to connect the filter assembly 10 with the component 50. Likewise, the particular connecting member structure of the cover member 12 may be suitably modified to connect with such other component (i.e. component 50). It further will be appreciated that the particular structure of component 50 and its connective configuration with the filter assembly is not limited to the specific structure shown. As discussed, the component 50 is meant to be construed as a generic component of a filtration system for which the filter assembly 10 can be connected to and disconnected from. As some examples, the component 50 may be a structure resembling a reservoir, container, or sump, and may also be valve cover such as used in combustion engines for access to the oil filtration system.

In an instance where the component 50 is a container or reservoir, fluid that enters the filter assembly 10 is filtered and separated through filter elements 16, 18, so that the liquid may collect in a reservoir 52 of the component 50 and ultimately be allowed to exit the fluid filter assembly through outlet 58 and flow back to the respective system for which the fluid is used. Gases are separated and exit through a vent port 15. The operation of the fluid filter assembly with respect to the component 50 is further described below.

In one operation of the fluid filter assembly, the assembly 10 may be employed in an engine oil filtration system. In some cases, the fluid filter assembly 10 described herein may be employed in such known combustion engines having turbo capability, and the assembly 10 may be used to separate air from liquid oil, aerosol, and mass particulate, so that clean air may be delivered or "breathed" to an air inlet duct port, such as a turbo inlet duct.

Referring back to FIGS. 4A-C, the component 50 includes an inlet 60 that allows fluid to enter the fluid filter assembly 10. In the example of an oil filtration system, the inlet 60 allows crankcase gases and liquid to enter the fluid filter assembly 10 through an interface 21 of the plate member 20. In one embodiment, the interface 21 is formed as part of the plate member 20. The interface 21 includes at least one nozzle 62 to allow entry into the fluid filter assembly 10. In one embodiment, the interface 21 is a conically shaped interface having at least one nozzle 62. It will be appreciated that more than one nozzle 62 may be employed and it further will be appreciated that the interface 21 is not limited to the specific structure shown. The interface 21 and nozzle structure may be constructed with configurations other than the conically shaped configuration shown, as long as the interface 21 is a suitable mating structure against the equipment (e.g. inlet 60 of component 50) it is engaging. In one embodiment, the interface 21 is a plastic structure as the main body of the plate member 20 and is configured to mate with another component (e.g. component 50) in a plastic on plastic sealing engagement. In an alternative embodiment, the interface 21 may be configured to include some space between the mated surfaces of the interface and the wall surfaces of the inlet 60 of component 50. That is, the plastic to plastic interface may not be a liquid tight seal, but may be if provided with a sealing or gasket material (not shown).

Fluid flowing through the inlet 60 and nozzle 62 may then flow through the slots 27a and openings of the locating member 27 to the inner space of the filter element 16. In one embodiment, another filter media 66 may be disposed between the nozzle 62 and slots 27a, such that the fluid (e.g. oil material) encounters a first filtration before entering the inside space of the filter element 16. The filter media may be, but is not limited to, a fibrous or foam material. Likewise, the nozzle 62 facilitates a first separation phase of the oil material through impact against the filter media 66 after going through the nozzle, and which is further described below.

Some of the fluid not entering filter element 16 also travels through openings 64, around the inlet 60 and collects in the volume containing reservoir 52 of the component 50. Oil accumulated in the reservoir 52 may travel through slots 29a and the opening through the locating member 29, so as to enter the inner space of filter element 18.

Figure 7:
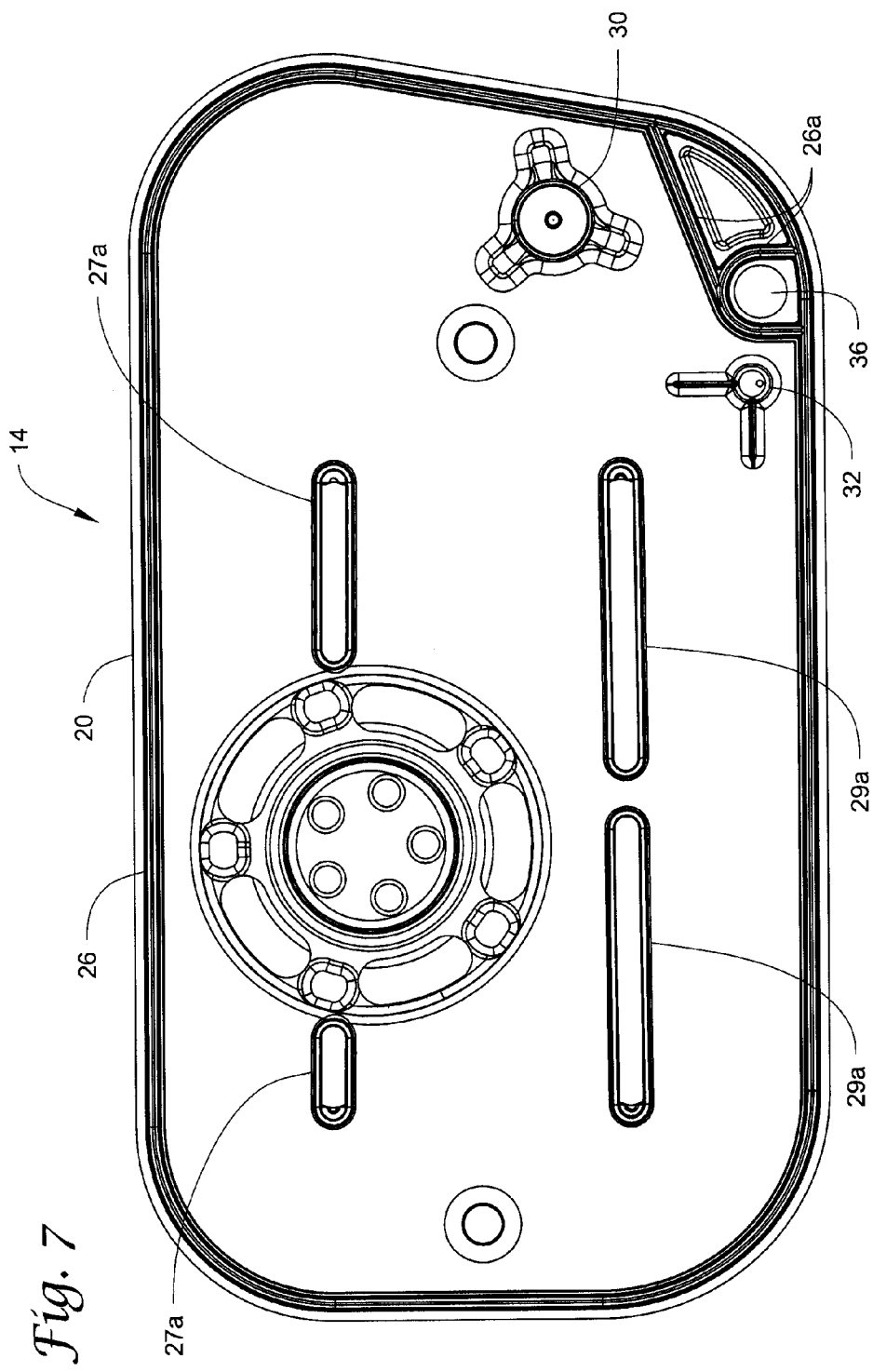
FIG. 7 is a bottom view of the fluid filter cartridge shown in FIG. 5 of the fluid filter assembly shown in FIG. 1.

The filter elements 16, 18 allow the oil material to go through a second stage separation by filtration through the filter media of the filter elements. The liquid oil coalesces when being filtered through the filter elements 16, 18. After being filtered through the filter elements 16, 18, the coalesced oil may flow and exit through outlet hole 36 of the plate member 20. As shown, the coalesced oil flows through the outlet hole 36 of the plate member 20 to an opening 58a of a drain tube 58. In one embodiment, an additional seal surface 26a is included to seal off the drain tube and engage a surface on the component 50 in a fluid tight sealing arrangement. FIG. 7 shows the seal surface 26a generally outlining a perimeter where the opening 36 is disposed.

The gases remaining in the fluid filter assembly 10, which have been separated from the liquid and mass oil material, exit the fluid filter assembly 10 through the vent port 15 as an air stream to an inlet duct port, for example a turbo inlet duct port. The vent port 15 is disposed on the cover member 12. The vent port 15 is an opening configured as a line connection to allow separated gases/air to exit and "breathe" out of the fluid filter assembly 10. As shown, port 15 is disposed on a side of the cover member 12 and proximate a top cover surface thereof.

The first stage and second stage separations help to separate the oil from the crankcase gases so that generally clean air (i.e. free of liquid oil, aerosol, or mass particulate flow) exits the vent port 15 of the fluid filter assembly 10. Such a configuration is useful for preventing coking, for example in a turbo inlet duct port, by minimizing the mass flow of oil and aerosol to the turbo inlet duct port. In a pressurized oil filtration system, oil material enters the fluid filter assembly at its highest pressure, where the fluid pressure of the oil material decreases after the first separation stage and decreases again after the second separation stage (i.e. coalesced oil and release of clean gases. The fluid filter assembly 10 as described is helpful for preventing such coking of the turbo inlet duct port, which could detrimentally affect turbo compression efficiency.

As further shown, the plate member 20 includes a relief or spritzen tube 32. In some instances, some oil collected in the reservoir 52 may be forced through the opening in the tube 32 due to the difference in pressure on the reservoir side of the plate member 20 relative to the filter element side of the plate member 20. That is, after the first stage separation, where oil material collects in the reservoir 52, the pressure is higher on the reservoir side causing some oil to be forced or spit out of the tube 32. In another embodiment, the plate member 20 further includes a by-pass valve 30. As known in the art, the by-pass valve 30 allows for further flow relief, such as in the event the fluid filter assembly 10 may become overpressurized during system operation.

Figure 9:
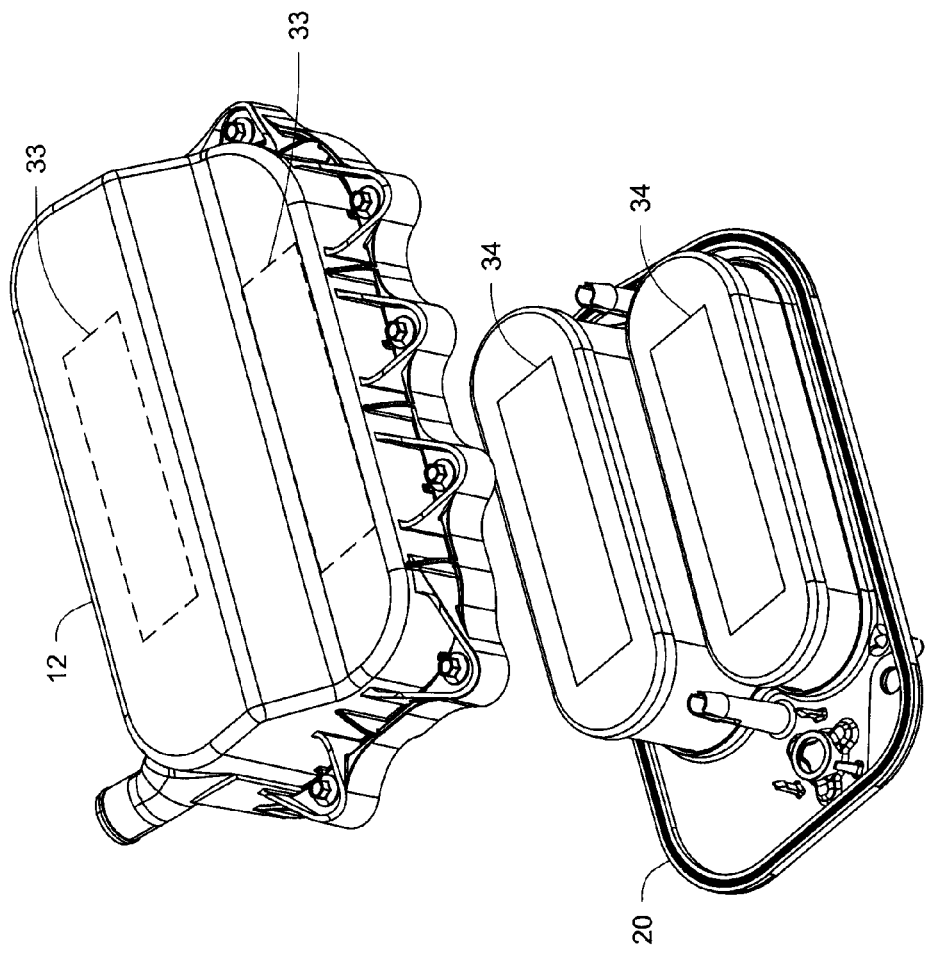
FIG. 9 is a perspective view of another embodiment of a fluid filter assembly.

FIG. 9 shows the fluid filter assembly 10 including another connecting structure 33, 34 for connecting the cover member 12 and the plate member 20. As shown, the connecting structure 34, 33 may be a hook and loop fastener respectively disposed on top surfaces of the end plates of the filter elements and disposed on underside surfaces of the cover member (see phantom lines for 33). The hook and loop fasteners may be strips of Velcro® disposed on the end plates of the filter elements and underneath the cover member, such that they are arranged to mate together when the cover member 12 and plate member are engaged.

In a filter servicing operation, a filter assembly as described herein can provide an ease of service that is cleaner and more efficient. In one embodiment, a method of servicing includes removing the fluid filter assembly. The cover member is disconnected from the filter cartridge, and the filter cartridge including plate member and the filter element(s) are replaced with a new filter cartridge having a new plate member and filter element(s). The cover member is connected to the filter cartridge having the new filter element(s), and the filter assembly having the new filter element(s) is replaced in connection with the filtration system (i.e. component 50). In the event that the filter elements are separable from the plate member, then the plate member may be reused and new filter elements may used to replace the old ones.

Given the seal surfaces and retention members of the filter assembly described above, the step of removing the filter assembly further includes retaining a seal between the cover member and the filter cartridge, at least while the filter assembly is being removed from a component of the filtration system. The filter assembly described herein can allow the cover member to be retained with the filter cartridge, while servicing occurs and until the cover member is removed from the filter cartridge to access the filter element(s). In such a servicing method, fluid leakage and dripping through the sealing surfaces can be prevented or at least minimized, such as through the sides of the filter assembly. In one example of practical servicing of the fluid filter assembly in oil filtration applications, after the engine is shut down the crankcase pressure (i.e. pressure in the component 50) decays to zero whether it is negative or positive relative to atmospheric pressure. After an elapsed amount of time from when a service person accesses the fluid filter assembly for servicing, the crankcase pressure usually has decayed and most of the oil has drained from the fluid filter assembly.

In another embodiment, a method of servicing a filter includes releasing the seal between the filter cartridge and a component of the filtration system, when the filter assembly is removed, and while retaining the seal between the cover and the filter cartridge. It will be appreciated that a force to remove the entire filter assembly is approximately 15 lbs (i.e. 3.37 Newtons). It will further be appreciated that the filter assembly is disposed in an environment that is pressurized to about 2 psi from the component (e.g. reservoir) to cover member. It will be appreciated that these force and pressurized values are merely exemplary and may depend upon the durometer of the seal and on how the fluid filter assembly is connected together, which may make the force more or less. Accordingly, it further will be appreciated that the fluid filter assembly can be suitably constructed and modified to accommodate other forces for removal and pressurized conditions and depending on the means it is connected together. After replacing the used filter element(s) and connecting the cover member to the filter cartridge with the new filter element(s), the cover member is in a sealing engagement with the filter cartridge through sealing surfaces of both the filter cartridge and the cover member. Replacing the filter assembly can further include sealing the filter cartridge with the component of the filtration system.

The filter assembly described herein includes sealing and retention features, which are configured to retain a cover and filter cartridge at least during removal of the filter assembly for servicing of a filter element of the cartridge. The filter assembly described can be constructed with a low profile to fit within existing spatial constraints of an environment in which the filter assembly is to be used. For example, the filter assembly may have a low profile where an aspect ratio of height of the filter assembly divided by general length of the assembly (H/L) is less than 1 may satisfy a "low profile" configuration for this filter assembly design.

The sealing and retention features are configured to maintain a seal between sealing surfaces thereof, such that fluid dripping and leakage may be minimized. Some benefits of such a fluid filter assembly can include providing a cleaner and more efficient method of servicing, where dripping and/or leakage can be prevented or at least minimized, and such that easier access can be obtained. In one example of engine oil filtration systems, where spatial constraints may cause difficulties in servicing a filter, it may not be necessary to move surrounding components such as an air filter housing to gain access to the filter assembly. As a result, cleaner service can occur that takes less time, while meeting the spatial constraints of an engine design.

The inventive concepts disclosed herein may be embodied in other forms without departing from the spirit or novel characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

We claim:

1. A filter assembly of a filtration system comprising:
a filter cartridge, the filter cartridge including:
at least one filter element configured to filter fluid therethrough and including a filter media surrounding an inner space of the at least one filter element with two open ends, the at least one filter element also includes an end plate that seals one of the two open ends of the at least one filter element so as to direct flow from the inner space, through the filter media, to outside the at least one filter element; and
a plate member connected to the at least one filter element; and
a cover member, the cover member configured to cover the at least one filter element and the plate member when the cover member is engaged with the filter cartridge;
wherein the at least one filter element is disposed entirely on a first side of the plate member that faces the cover member when the filter cartridge is engaged with the cover member, the at least one filter element is further disposed between the plate member and the cover member, the plate member includes a first seal surface disposed on the first side of the plate member, and a second seal surface disposed on a second side of the plate member that faces away from the cover member when the filter cartridge is engaged with the cover member, the first seal surface is configured to seal with a seal surface of the cover member, and the second seal surface is configured to seal with another component of a filtration system, so as to at least minimize fluid leakage and dripping through the sealing surfaces during a servicing operation; and
wherein the filter cartridge is removable with the cover member during a service operation.

2. The filter assembly of claim 1, further comprising at least one retention member disposed on the plate member, the at least one retention member extends upward from the first side of the plate member and is located externally to the at least one filter element, wherein the at least one retention member is configured to connect and disconnect the filter cartridge to the cover member, to retain the filter cartridge to the cover member, and to retain a seal between the seal surfaces of the plate member and the cover member.

3. The filter assembly of claim 2, further comprising at least one connecting structure disposed on the cover member, wherein the at least one connecting structure is configured to receive the at least one retention member, connect to the at least one retention member, and retain the seal between the seal surfaces of the plate member and the cover member.

4. The filter assembly of claim 1, wherein the first seal surface and the second seal surface are disposed on the plate member proximate a perimeter of their respective sides.

5. The filter assembly of claim 1, wherein both the first seal surface and the second seal surface are configured as overmolded structures disposed on the plate member, wherein the first and second seal surfaces are integrally molded as part of the plate member.

6. The filter assembly of claim 1, wherein the first seal surface is compressible when the filter cartridge is engaged with the cover member, and the second seal surface is compressible when the filter cartridge is engaged with another component of a filtration system.

7. The filter assembly of claim 1, wherein the first and second seal surfaces are respectively disposed in grooves located on the first side and the second side of the plate member, such that the first and second seal surfaces are disposed on opposite major surfaces of the plate member.

8. The filter assembly of claim 1, wherein the plate member further comprises a locating structure, wherein the locating structure is configured to allow the at least one filter element to be properly positioned and retained on the plate member.

9. The filter assembly of claim 1, wherein the cover member is configured to receive fluid to be filtered through the filter assembly, and the filter cartridge is configured to filter fluid through the at least one filter element and allow filtered fluid to exit the filter assembly.

10. A filter cartridge comprising;
at least one filter element including filter media surrounding an inner space of the at least one filter element with two open ends, the at least one filter element also including an end plate that seals one of the two open ends of the at least one filter element so as to direct flow from the inner space, through the filter media, to outside the at least one filter element; and
a plate member connected to the at least one filter element,
wherein the at least one filter element is disposed entirely on a first side of the plate member, a first seal surface is disposed on the first side of the plate member, and a second seal surface is disposed on a second side of the plate member which is opposite the first side of the plate member, the first seal surface is configured to seal with a component of a filtration system, and the second seal surface is configured to seal with a different component of the filtration system.

11. The filter cartridge of claim 10, further comprising at least one retention member disposed on the plate member, wherein the at least one retention member extends upward from the first side of the plate member and is located externally to the at least one filter element, and the at least one retention member is configured to retain the filter cartridge to a separate cover member and to retain a seal between the plate member and the cover member.

12. The filter cartridge of claim 10, wherein the first seal surface and the second seal surface are respectively disposed in grooves located on the first side and the second side of the plate member and proximate a perimeter of their respective sides.

13. The filter cartridge of claim 10, wherein both the first and the second seal surfaces are configured as overmolded structures disposed on the plate member, the first and second seal surfaces are integrally molded as part of the plate member, and the first and second seal surfaces are compressible when the filter cartridge is engaged to other components of the filtration system.

14. The filter cartridge of claim 10, wherein the plate member further comprises a locating structure, wherein the locating structure is configured to allow the at least one filter element to be properly positioned and retained on the plate member.

15. A seal plate for a filter assembly comprising:
a planar member including two opposite major surfaces, wherein one of the major surfaces includes a seal member disposed proximate to a perimeter thereof, the other of the two major surfaces includes a seal member disposed proximate to a perimeter thereof, one seal member is configured to seal with a separate cover member, and the other seal member is configured to seal with a component of a filtration system; and
at least one retention member disposed on the planar member, wherein the at least one retention member extends upward from a first side of the planar member and is externally to a filter element when the filter element is connected to the planar member, and the at least one retention member is configured to connect and disconnect the seal plate to the separate cover member, retain the seal plate to the separate cover member, and to retain a seal between the planar member and the separate cover member through one of the seal members.

* * * * *